United States Patent [19]

Glanton

[11] Patent Number: 5,078,049

[45] Date of Patent: Jan. 7, 1992

[54] BARBECUE PIT AND SMOKER

[76] Inventor: John F. Glanton, 3445 4th Ave. S., Minneapolis, Minn. 55408

[21] Appl. No.: 466,018

[22] Filed: Jan. 16, 1990

[51] Int. Cl.$^5$ .................. A47J 37/00; A47J 37/04
[52] U.S. Cl. ......................... 99/482; 99/340; 99/448
[58] Field of Search ............ 99/340, 480–482, 99/448, 449, 450, 343, 352, 467, 385, 400; 126/25 R, 41 R, 41 A, 9 R, 9 B

[56] References Cited

U.S. PATENT DOCUMENTS

| | | | |
|---|---|---|---|
| 2,842,043 | 7/1958 | Reuland | 126/25 R |
| 2,846,937 | 8/1955 | Jones . | |
| 3,049,071 | 8/1962 | Diack | 126/25 R |
| 3,190,281 | 6/1965 | Northwood | 126/9 R |
| 3,421,493 | 1/1969 | Miller | 126/9 B |
| 3,433,211 | 3/1969 | Latta | 126/25 R |
| 3,699,876 | 10/1971 | Ellis . | |
| 3,841,211 | 10/1974 | Ellis | 126/9 R |
| 4,162,650 | 7/1978 | Davis et al. . | |
| 4,233,890 | 11/1980 | Jansen | 99/340 |
| 4,355,570 | 10/1982 | Martin et al. | 99/446 |
| 4,489,706 | 12/1984 | Hait | 126/9 B |
| 4,643,162 | 2/1987 | Collins | 99/482 |
| 4,643,163 | 2/1987 | Martinez . | |
| 4,669,447 | 6/1987 | Kelly | 99/482 |
| 4,721,037 | 1/1988 | Blosnich . | |

Primary Examiner—Timothy F. Simone

[57] ABSTRACT

An enclosed cooking apparatus for barbecuing, curing and smoking food products such as beef, chicken, pork, fish and wild game in which a combustion chamber is disposed in the base for burning a fuel source, such as charcoal and wood. Food products are supported within the cooking chamber by a plurality of slidable shelves and arranged in such a manner that heat and smoke circulating through the enclosed apparatus performs the cooking and smoking operation on the food products. The apparatus can be constructed to perform specific cooking tasks.

6 Claims, 4 Drawing Sheets

BARBECUE PIT AND SMOKER

BACKGROUND FIELD OF INVENTION

The present invention generally relates to cooking apparatus and more particularly to apparatus for barbecuing and smoking food products.

BACKGROUND DESCRIPTION OF PRIOR ART

As is generally known a technique for cooking some food products such as beef, chicken, pork, fish and wild game is barbecuing and smoking. In this process the food products are subjected to heat and smoke until they have reached the desired consistency, succulence and color. There are many techniques for accomplishing this process. In its earliest form the food product was suspended over an open flame rotated and basted in its own juice to reduce product shrinkage and replace moisture that was being driven from the product by the heat. Sometimes large stones were placed in and around the fire which would absorb the heat and thus reduce the time temperature variations. These methods were slow and results erratic in the hands of all but the most skilled technician. The cost of fuel was of no consequence since the main source, wood, was in abundance.

As space, time and fuel became more valuable many patents were issued to inventors bent on continuing the art of barbecuing and smoking. Many of these devices have drawbacks which include:

(a) the inability to precisely control the rate of combustion, (b) the inability to precisely regulate the rate of ingress and egress of combustion gasses, (c) the inability to precisely control cooking temperature, (d) the inability to minimize food product dehydration and shrinkage, (f) difficult maintenance and cleaning of the apparatus. U.S. Pat. Nos. 1,837,924 and 4,162,650, along with other patents, sought to minimize dehydration and shrinkage by constructing a cooking apparatus that contained a pan of water which is heated to the boiling point to steam the product. Unfortunately, this process dilutes the natural juices and a film of smoke and water is deposited on the surface of the product.

U.S. Pat. No. 4,355,570, 4,643,136 and 4,721,037 place Wood chips on an electric or gas heated grill in an effort to control cooking temperatures and create smoke simultaneously. In the latter case, the cooking chamber is exposed to gas fumes which are absorbed by the food product. These arrangements are more likely to smolder then to burn which deprives the food product of its most distinctive characteristic that is derived from burning wood.

U.S. Pat. No. 4,643,163, in an effort to even out the time temperature curve, calls for an expensive marry go round food shelf arrangement.

As with most other forms of food preparation processes it is essential to maintain a proper and steady cooking temperature. This is not possible if the food product is exposed to the external air during basting and turning.

As a rule, consideration must be given to the amount of fuel consumed during the cooking process. Generally, there is no control over the moisture content of the wood fuel source. If the wood is dry it is consumed rapidly or if it is moist it burns slowly. In most prior art these conditions are not discussed.

The present invention is distinguished over the known prior art in that complete control over the rate of combustion of the wood or charcoal fuel source is provided without the aid of oil, gas or electricity.

The invention is formed by a main body portion defining a cooking chamber and having a front opening with sliding doors mounted to main body portion for opening and closing the front opening, allowing communication into the cooking chamber. Wherein a plurality of removable support shelves, vertically spaced apart, are placed at desired heights with respect to the fuel source, upon which the food product is placed. A base is disposed at the bottom of this enclosure, adapted to receive therewithin the fuel source.

Instrumentalities are provided on the base and the cooking chamber in the form of seals and dampers to regulate:

(a) the rate of fuel consumption, (b) the rate at which the cooking gases move in and out of the cooking chamber, (c) the time temperature variations, (d) The rate of product dehydration and shrinkage, The removal of the sliding doors allows instant access to the entire interior area for maintenance and cleaning.

The varied requirements of barbecuing, which change as a function of the time temperature variations, can be taken into consideration during the cooking period so that the finished food product will have the desired properties.

OBJECTS AND ADVANTAGES

Accordingly, this invention has as its objective, the provisions of a new and novel barbecue pit and smoker.

A further objective of this invention contemplates providing a device as characterized above, in which the rate of combustion and time temperature variables are controlled precisely and with minimal effort.

It is yet another objective of this invention to provide a device as characterized above, wherein ingress and egress of combustion air can be precisely controlled.

It is yet another objective of this invention to provide a device as characterized above, wherein dehydration and shrinkage of the food product may be held to a minimum.

It is a further objective of this invention to provide a device as characterized above, which is so constructed that maintenance and cleaning are accomplished with a minimum of effort.

It is a further objective of this invention to provide a device as characterized above, which is so constructed that large or small portions of food product can be cooked in an economical manner.

A further objective of this invention contemplates providing a device as characterized above, which can be so constructed to perform specialized cooking tasks, such as curing and smoking or barbecuing lean or fatty products.

It is a further objective of this invention to provide a device as characterized above, which will produce a food product that is appealing to the eye, tasty and of the desired consistency.

It is a further objective of this invention to provide a device as characterized above, which can be mass produced at reasonable cost.

It is a further objective of this invention to provide a device as characterized above, which is safe to use.

These other objects will be made manifest when considering the following detailed specification taken in conjunction with the appended drawings.

BRIEF DESCRIPTION OF DRAWING FIGURES

Figure 1:
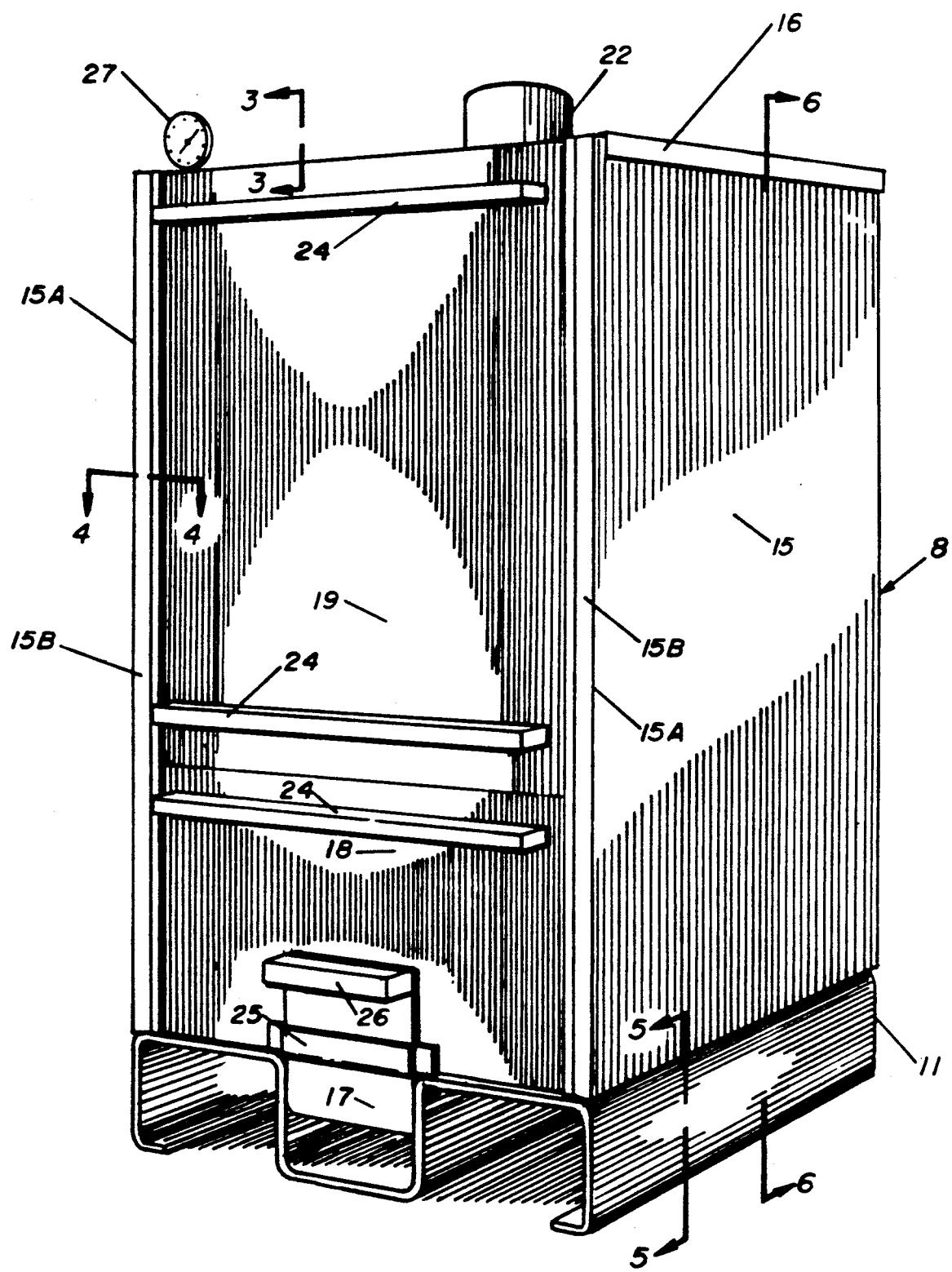
FIG. 1 is a perspective of the apparatus according to the present invention.

REFERENCE NUMERALS IN DRAWINGS 7 cooking chamber
8 outer jacket
11 base and combustion chamber
12 spacer channels
13 inner liner walls
13A inner liner free vertical edge
13B inside track and spacer flange 14 inner liner top wall
14A inner liner top wall front flange
15 outer jacket walls
15A outer jacket free vertical edge
15B outer jacket pressure seal and outside track
16 outer jacket cover
16A outer jacket cover flange and pressure seal
17 combustion chamber damper
18 lower sliding door
19 upper sliding door
20 food product rack support channels
21 food product racks
22 stack
23 stack damper
24 sliding door handles
25 combustion chamber damper keeper
26 combustion chamber damper handle
27 sensor
28 interior wall space
29 convection currents
30 exhaust gases
31 heat source
32 food product placement

BRIEF DESCRIPTION OF THE PREFERRED EMBODIMENT

Referring to the drawing numbers now, wherein like reference numerals refer to like parts throughout the various drawing figures.

As shown in FIG. 1 a barbecue pit and smoker embodying the present invention is substantially box shaped and is constructed of steel and sheet metal in the conventional manner. The main body portion is defined by a cooking chamber 7 FIG. 2, an outer jacket s FIG. 1 and a front opening.

As shown in figure the front opening is closed by two insulated sliding steel doors 18 and 19.

Figure 2:
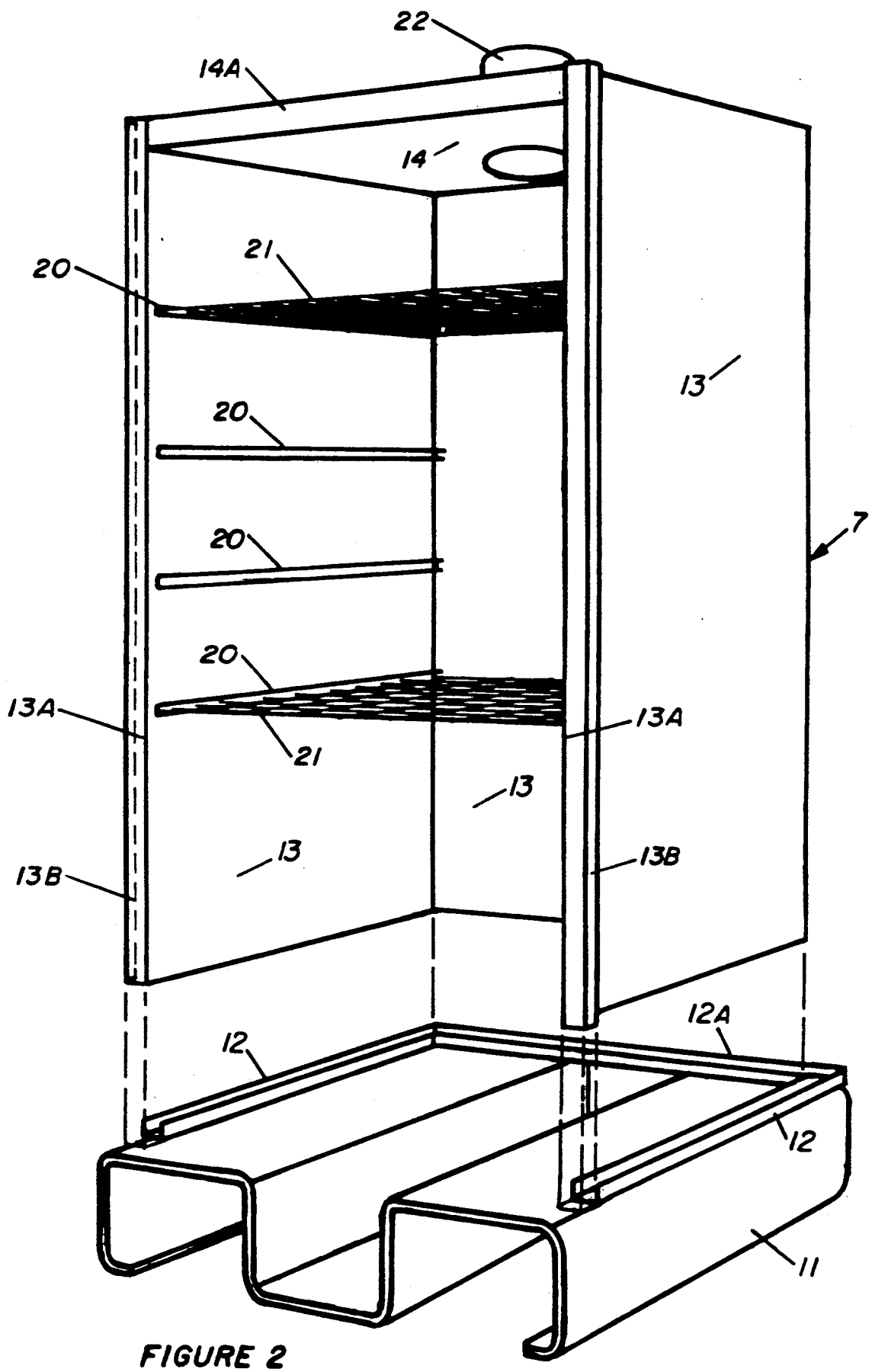
FIG. 2 is an exploded view of the base and cooking chamber.

As shown in FIG. 2, the base 11 is rectangular in plan view. The front view is U shaped in the middle and the sides are formed by two unequal legged channels. The upper most leg, being the longer leg, connects to the top of the upward extending adjacent leg of the U shape. The U shaped center forms the combustion chamber. These shapes taken together form a level and stable base for the present invention.

As shown in FIGS. 2 there are three spacer channels. One, 12A, across and parallel to the rear of the base 11 and two channels, 12, one each along and parallel to each side of the base. Each being joined to the base by spot welds.

Figure 4:
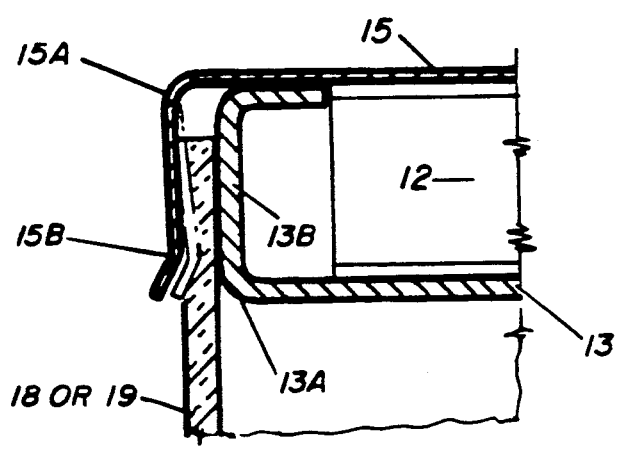
FIG. 4 is a view in detail of the portion indioated by lines 4—4 in FIG. 1.
Figure 5:
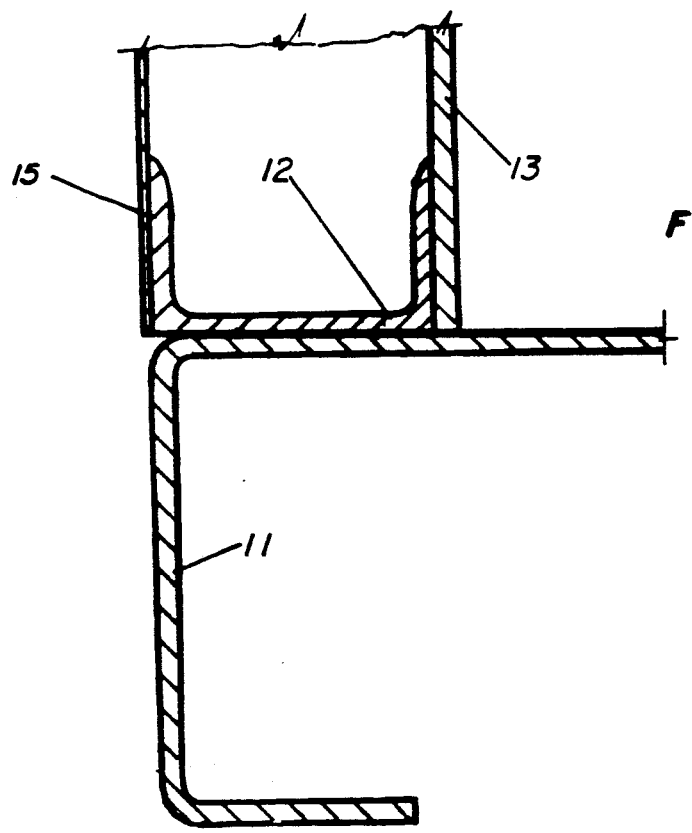
FIG. 5 is a view in detail of the portion indicated by lines 5—5 in FIG. 1.

As shown in FIG. 2, the cooking chamber 7 is primarily rectangular in plan view and has an inner liner. The inner liner has a rear wall, two parallel side walls 13 and a top wall 14. The side walls 13 terminating at their free vertical edges 13A in an outwardly extending L shaped flange 13B as shown in FIGS. 2 and 4, the width of which being the width of the spacer channels 12. These flanges form the inside track 13B for the sliding doors 18 and 19 and a spacer flange 13B for the outer jacket walls 15. The inner liner walls 13 being positioned by the inside legs of the spacer channels 12 and joined to the base 11 by continuous fillet welds. The height of the inner liner walls 13 being such as to afford substantial head room for the food products 32 placed and arranged On the food product racks 21 which are made of substantial lathing.

Figure 6:
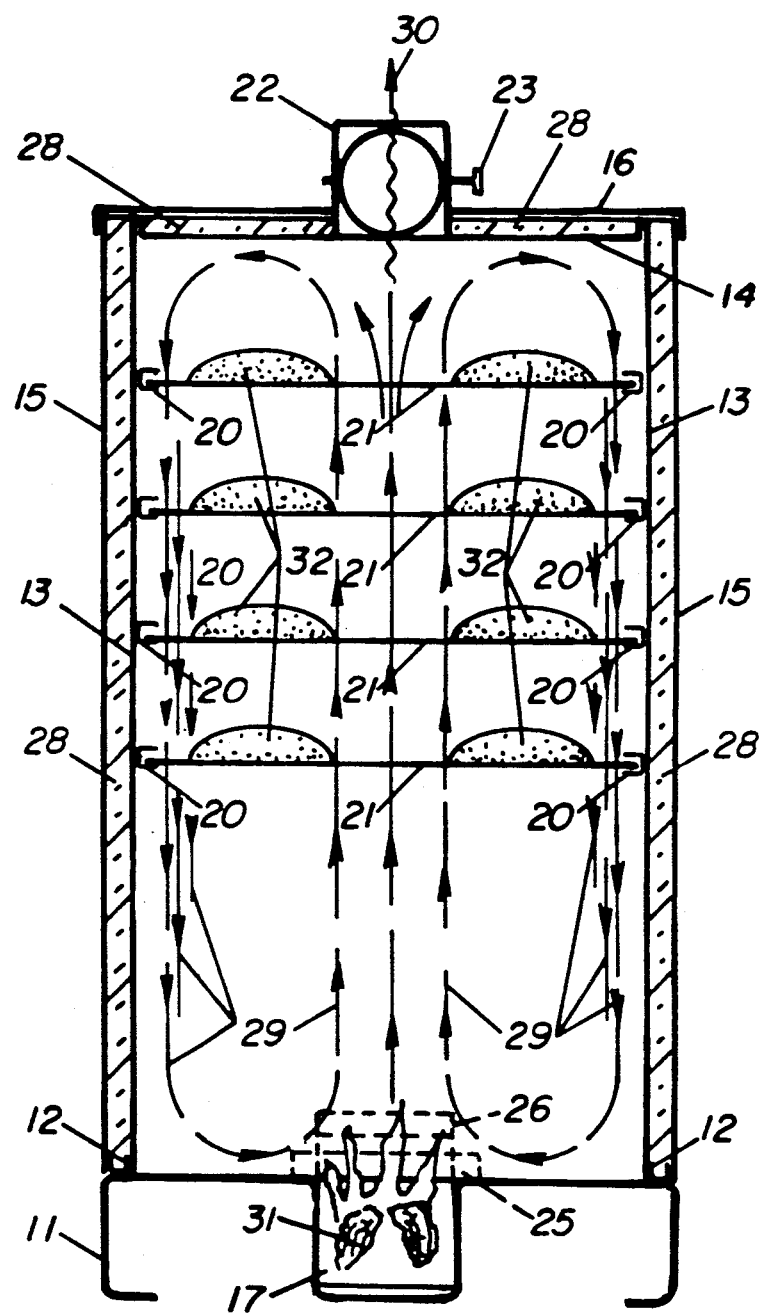
FIG. 6 is a view in section of the portion indicated by line 6—6 in FIG. 1.

As shown in FIG. 2 and 6, C shaped channel rack supports 20 with inwardly projecting legs, vertically spaced and aligned in planar pairs, are joined to the inner liner 13 side walls by fillet welds. These rack supports being of such length as to support safely, the removable food product racks 21 and the food products 32 placed thereon.

Figure 3:
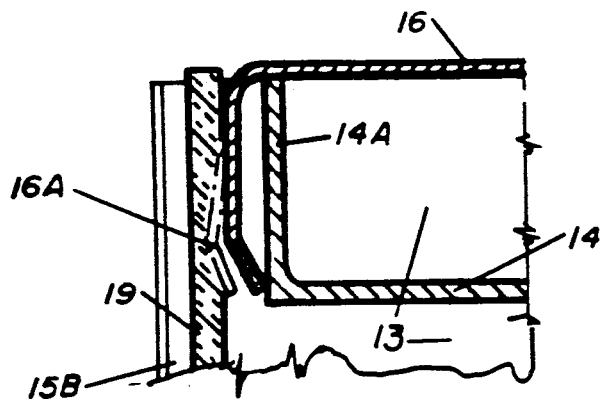
FIG. 3 is a view in detail of the portion indicated by lines 3—3 in FIG. 1.

As shown in FIGS. 2, 3 and 6, an inner liner top wall 14, being rectangular in plan view with one upward extending front flange 14A and an aperture to accommodate the stack 22, is joined to the inner liner walls 13 near the top by a continuous fillet weld.

A stack 22, as shown in FIGS. 1, 2 and 6 extending upward from the inner liner top wall 14 contains a stack damper, 23 FIG. 6, capable of restricting the egress of exhaust gases 30 from the cooking chamber, is joined to the inner liner top wall 14 at the aperture by a continuous fillet weld.

As shown in FIGS. 1 and 6 the outer jacket 8 is primarily rectangular in plan View and has an outer jacket rear wall, two parallel outer jacket side walls 15 and an outer jacket cover 16. The outer jacket walls 15 are joined and sealed to the outside legs of the spacer channels 12 and to the spacers flanges 13B in such a manner as to enable the outer jacket walls 15 to retain material, if any, placed in the interior spaces 28. The side walls vertical free edges 15A terminating in an inwardly projecting flange bent to form a V shaped pressure seal 15B as shown in FIG. 4. This forms the outside track of the sliding door track and acts against the sliding doors 18 or 19 when they are in place as shown in FIG. 4. The height of the outer jacket walls 15 being that of the inner liner walls 13.

As shown in FIG. 1, 3 and 6 the outer jacket cover 16, is rectangular in plan view and contains an aperture to accommodate the stack 22. There being four downward extending flanges, one at the rear wall of the outer jacket 8 and one at each of the parallel side walls of the outer jacket 8. These elements form a cover to fit over the top of the outer jacket walls 15 and are joined thereto. The fourth flange at the front of the outer jacket cover 16A is downwardly bent to form a V shaped pressure seal 16A acting against the inside face of the sliding door 19 as shown in figure 3.

Shown in FIGS. 1, 3 and 4 are vertical sliding insulated steel doors 18 and 19 which are rectangular in shape and ride in tracks formed by the inner liner flanges 13B and outer jacket flanges 15B as shown in FIG. 4. Wood door handles 24 are conveniently located to facilitate the cooking operations.

Shown in FIGS. 1 and 6 is a combustion chamber damper 17 held slidably in place by keeper 25. A wood handle 16 is placed at a convenient location to facilitate the cooking operation. The damper 17, in closed position, is so constructed as to deprive sufficient combustion air to the heat source 31.

Shown in FIG. 1 is a sensor 27 for monitoring conditions inside the cooking chamber 7.

As shown in FIGS. 3, 4, 5 and 6, the walls defining the cooking chamber 7 and the outer jacket 8 form double walls. The interior spaces 28 may be empty or be filled with sand or insulation.

OPERATION OF INVENTION

As shown in FIG. 6 a fuel source 31 is placed in the combustion chamber contained in the base 11. The fuel source 31 is ignited by ordinary means. The dampers 17 and 23 and the sliding doors 18 and 19 are manipulated until the inner chamber is brought to slightly above optimum temperature. At this point the food product 32 is placed and arranged on the food product shelves 21 as shown in FIG. 6.

The doors 18 and 19 are closed and the dampers, 17 and 23, are adjusted to regulate the ingress and egress of combustion gases 29 such that the optimum internal temperature for a particular product can be maintained for an extended length of time.

The nearly airtight construction of the cooking chamber 7 in combination with the dampers 17 and 23 permits the precise control of the rate of combustion. The rate of combustion controls the rate of fuel consumption. The rate of fuel consumption controls the cooking temperature. The cooking temperature determines the cooking time. The rate of combustion controls the velocity of the convection currents 29 within the cooking chamber 7. The velocity of the convection currents controls the rate of dehydration and shrinkage of the food product 32.

Maintaining optimum temperature enables the operator to estimate cooking times accurately, thus avoiding over or under cooking. The placement of the food product 32 negates the necessity of handling the product during the cooking process.

Food products requiring smoke, low heat and dehydration are best prepared when the interior spaces 28 contain air. The relatively high heat loss causes the internal air near the exterior walls FIGS. 3, 4, 5 and 6 of the cooking chamber to loose heat rapidly. Thus, causing a large temperature differential across the cooking chamber 7. Thereby increasing the velocity of the convection currents 29, causing the food products to dry, cook slowly and absorb smoke.

Food products requiring smoke, high heat for rendering such as fatty meats and game, are best prepared when the interior wall space 28 contains insulation. The relatively low heat loss across the cooking chamber walls cause a low temperature differential within the cooking chamber 7. Thus the convection currents 29 move more slowly thereby maintaining high temperatures for rendering and at the same time, smoking and cooking the food product.

Food products requiring smoke and steady temperatures are best prepared when mineral filler such as sand is enclosed in the interior wall space 28. The ability of a mineral filler to store heat tends to damp out extreme temperature variation, much as the stones mentioned above, thus causing the convection currents 29 to move at a moderate, steady rate and at a steady temperature, without excessively drying out and shrinking the food product and allowing the food to cook in its own juices and absorb smoke.

As is evident from the foregoing discussion the precise control of combustion air, the nearly airtight construction of the cooking chamber 7, different types or lack of insulation 28 and the use of the sensor 27 affords the operator here to for unavailable control over wood and charcoal barbecuing and smoking.

Having thus described the invention, it should be apparent that numerous structural modifications are contemplated as being part of this invention as set forth herein above and defined herein below by the claims.

I claim:

1. A barbecue pit and smoking apparatus comprising:
    a main body portion defining a cooking chamber, having a spaced apart outer jacket and a front opening,
    a closing means slidably mounted to said main body portion for closing said front opening,
    a base being rectangular in plan view containing a combustion chamber and means supporting said cooking chamber and said outer jacket in a level and stable position,
    damper means regulating the volume and path of combustion air into the combustion chamber,
    an inner liner being primarily rectangular in plan view, having a rear wall, two parallel side walls and a top wall, means forming simultaneously an outward extending spacer flange and an inside track for said closing means at each of the free vertical edges of said side walls, having a vertical height to substantially cover the food products being cooked, means joining the liner to said base with an airtight connection, said top wall, being rectangular in plan view, having a front flange extending upward to the top of said inner liner, an aperture disposed in said top wall to accommodate egress of smoke and cooking chamber gases from said cooking chamber, means joining said top wall to the inside surfaces of said inner liner walls with an airtight connection,
    a stack connecting said cooking chamber to the exterior area through said aperture, damper means regulating egress of smoke and cooking chamber gases, means joining said stack to said top wall with an airtight connection,
    said outer jacket, being primarily rectangular in plan view, having an outer jacket rear wall, two parallel outer jacket side walls and an outer jacket cover, being uniformly spaced apart from said inner liner by said outward extending spacer flanges, means forming an outside track and pressure seal between said closing means and said inside track at each of the free vertical edges of said outer jacket, means joining and sealing the jacket to said base and said outward extending spacer flanges, said outer jacket cover being rectangular in plan view, having an aperture disposed in said outer jacket cover to accommodate said stack, means securing said outer jacket cover to the top of the outer jacket walls, means forming a pressure seal between said closing means and the front of said outer jacket cover, rack supports mounted vertically spaced and in planar pairs on the interior surface of the side walls of said inner liner, a plurality of substantially planar food product racks for supporting the food product during cooking, said food product racks being made of substantial lathing and slidably mounted within said inner liner on said rack supports.

2. The barbecue pit and smoking apparatus of claim 1 further including insulation between said cooking chamber and said outer jacket.

3. The barbecue pit and smoking apparatus of claim 1 further including mineral filler between said cooking chamber and said outer jacket.

4. The barbecue pit and smoking apparatus of claim 1 further including a sensor for monitoring conditions in said cooking chamber.

5. The barbecue pit and smoking apparatus of claim 2 further including a sensor for monitoring conditions in said cooking chamber.

6. The barbecue pit and smoking apparatus of claim 3 further including a sensor for monitoring conditions in said cooking chamber.

* * * * *